Feb. 19, 1952 A. S. KROTZ 2,586,061
TRUCK FOR RAIL VEHICLES
Original Filed Nov. 26, 1943
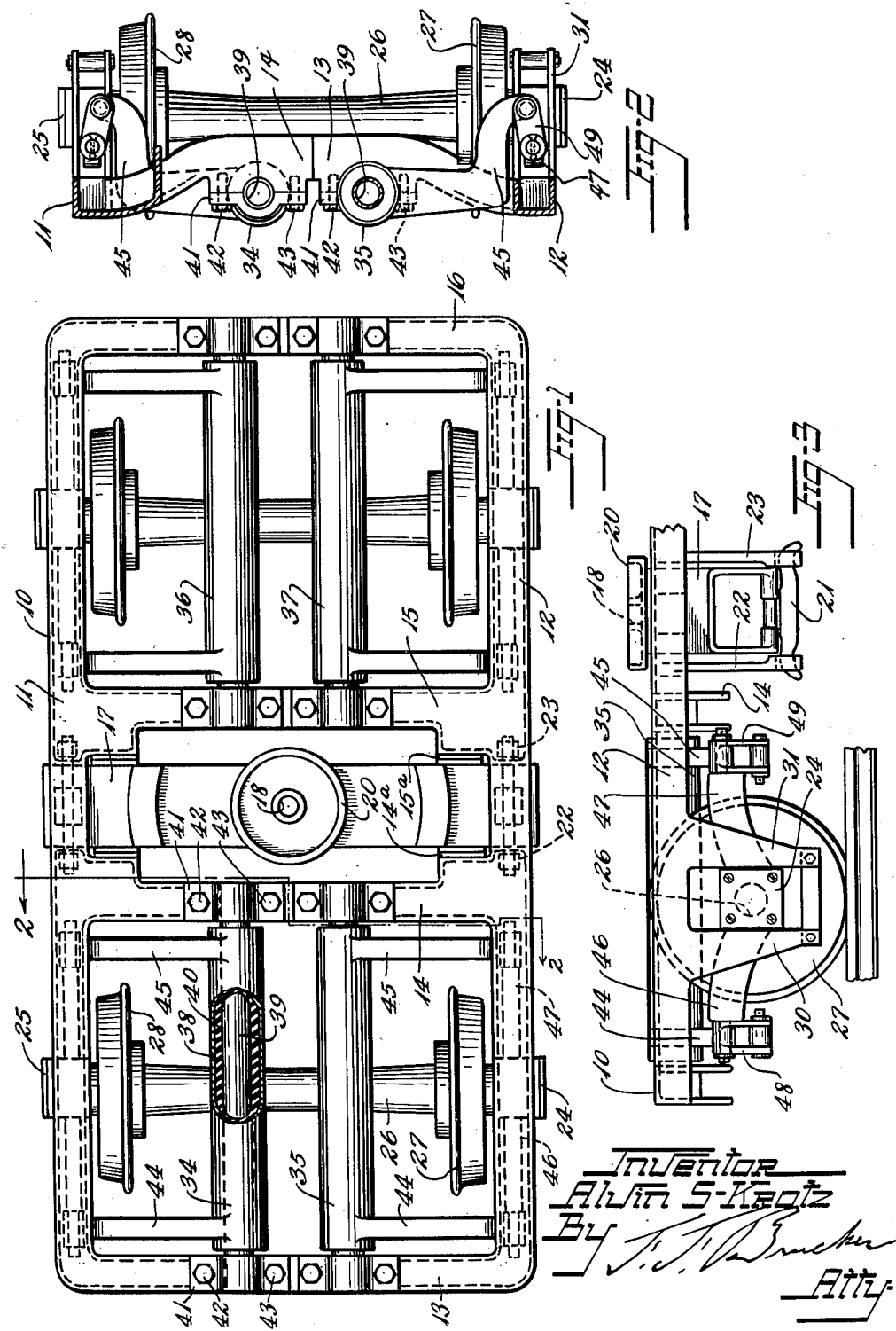

Patented Feb. 19, 1952

2,586,061

UNITED STATES PATENT OFFICE 2,586,061

TRUCK FOR RAIL VEHICLES

Alvin S. Krotz, Akron, Ohio, assignor to The B. F. Goodrich Company, New York, N. Y., a corporation of New York Original application November 26, 1943, Serial No. 511,776. Divided and this application February 15, 1946, Serial No. 647,803

5 Claims. (Cl. 105—197)

This invention relates to vehicle trucks and more particularly to trucks for vehicles operated upon rails. The present application is a division of my application Serial No. 511,776, filed November 26, 1943, now abandoned.

With increase in the speeds of operation of railway trains and similar rail operated vehicles it has become desirable to provide more effective cushioning of the load, to improve riding comfort, and to reduce noise and vibration.

The principal objects of the present invention are to provide more effective cushioning of the load, to damp out shock and vibration, to reduce side roll of the vehicle, to provide improved springing of the wheels of the truck, to provide convenient adjustment of the cushioning means.

These and other objects will appear from the following description and the accompanying drawings.

Of the drawings:

Fig. 1 is a plan view of a rail truck constructed in accordance with and embodying the invention in one of its forms, parts being broken away.

Fig. 2 is a cross-sectional view thereof taken on line 2—2 of Fig. 1.

Fig. 3 is a side elevation of a portion thereof, parts being broken away.

Referring to the drawing, the numeral 10 designates a truck frame comprising a pair of side frames 11, 12 connected to each other by cross members 13, 14, 15 and 16.

For supporting the load of the vehicle from the frame, a bolster 17 is provided extending crosswise of the truck and has a king pin aperture 18 for receiving a king pin, and a center bearing 20 thereabout for rotatably pivoting the truck with respect to the vehicle body about a vertical axis. The bolster is suspended from the frame 10 by stirrup bars 21 extending thereunder and pivotally connected to the frame by links 22, 23. Suitable guides 14a, 15a on the frame prevent fore and aft movement of the bolster with respect to the frame but permit movement of the bolster crosswise of the truck. Wheels 27, 28 are fixed to an axle 26 at one end of the truck and similar wheels are fixed to a similar axle at the other end thereof.

For guiding the journal boxes 24, 25 within which the axle 26 is rotatably journaled, the frame members 11, 12 are formed with depending pedestals such as 30, 31 (see Fig. 3) at an axle position. These confine the journal boxes but permit vertical movement thereof. Similar pedestals confine the boxes about the other axle.

For resiliently cushioning and transmitting the load from the frame 10 to the axles, torsion bushing structures 34, 35, 36, 37 are provided. Each torsion bushing structure has a hollow cylindrical housing such as 38, a shaft 39 of greater length extending therethrough in the longitudinal direction of the truck, and a resilient body or bushing 40 of rubber or other rubber-like material between the housing and the shaft and fixed to the housing at its outer surface and to the shaft at its inner surface as by a bond vulcanization. The shafts are adjustably secured to the frame 10 and for this purpose their ends are clamped against half-round seats formed on the cross members of the frame, as by cap members 41 held by bolts 42, 43. The caps and the shafts may be keyed to each other and preferably have interfitting serrations for adjustably securing them together at different angular positions.

Each housing member has a pair of parallel arms 44, 45 fixed thereto and extending substantially horizontally toward the sides of the truck. Arms 44, 45 are pivotally secured to yoke arms 46, 47 (see Fig. 3) of a journal box 24 by links 48, 49. The arrangement is such that the load on the frame 10 is transmitted through the arms of the four torsion bushing structures to the four journal boxes in which the axles rotate.

As the torsion bushings have their axes close to the center line of the truck with their axes extending in the direction of travel and their arms extending toward the sides of the truck, side roll of the truck under loads causing deflection of the arms is reduced to a minimum. This results as each degree of arm rotation caused by torsional deflection of the torsion bushings will represent a very small angle of tilt or roll of the coach body since the outer ends of the spring arms are widely spaced.

The term rubber-like material as used in the specification and claims includes natural rubber and synthetic plastic materials and compositions thereof having the properties of elasticity, resilience, and deformability under pressure and capability of being vulcanized and bonded by vulcanization to metals in a manner similar to natural rubber.

These and other variations may be made without departing from the scope of the invention as it is defined by the following claims.

I claim:

1. A truck for a rail vehicle, said truck comprising a pair of parallel wheeled axles each having a pair of wheels fixed thereto in spaced-apart relation, a truck-frame structure comprising a pair of side-frame members and means holding them in fixed parallel relation, said side-frame members having vertical guideways, journal bearings each slideably mounted for vertical movement in said guideways for journaling the ends of said axles, pairs of resilient spring structures mounted on said truck-frame structure for supporting said frame structure from said axles, there being one spring structure at each side of the longitudinal center line of the truck for each of said axles, each said spring structure comprising a housing member, an inner member extending therethrough in spaced-apart relation thereto, and an intermediate body of resilient rubber-like material therebetween and secured to said members, one of said members of each spring structure being fixed to said car-supporting frame structure with the axis of the spring structure parallel to and adjacent said center line of the truck, and the other said member of each spring structure having an arm extending toward the side of the truck with its end supported by and connected to a journal bearing at an end of an axle for swinging movement of said arm upon vertical movement of said journal bearing in its guideway.

2. A truck for a rail vehicle, said truck comprising a pair of parallel wheeled axles each having a pair of wheels fixed thereto in spaced-apart relation, a truck-frame structure comprising a pair of side-frame members and means holding them in fixed parallel relation, said side-frame members having vertical guideways, journal bearings each slideably mounted for vertical movement in said guideways for journaling the ends of said axles, pairs of resilient spring structures mounted on said truck-frame structure for supporting said frame structure from said axles, there being one spring structure at each side of the longitudinal center line of the truck for each of said axles, each said spring structure comprising a housing member, an inner member extending therethrough in spaced-apart relation thereto, and an intermediate body of resilient rubber-like material therebetween and secured to said members, one of said members of each spring structure being fixed to said car-supporting structure with the axis of the spring structure parallel to and adjacent the said longitudinal center line of the truck, and the other said member of each spring structure having an arm extending toward the side of the truck for swinging movement of said arm upon vertical movement of said journal bearing in its guideway, and link means pivotally connecting and supporting said arm from a journal bearing at an end of an axle.

3. A truck for a rail vehicle, said truck comprising a pair of parallel wheeled axles each having a pair of wheels fixed thereto in spaced-apart relation, a truck-frame structure including lateral spacing members and a pair of parallel side-frame members held in spaced-apart relation thereby, said side-frame members having vertical guideways, journal bearings each slideably mounted for vertical movement in said guideways for journaling the ends of said axles, pairs of resilient spring structures mounted on said car-supporting structure for supporting said frame and axle, there being one spring structure at each side of the longitudinal center line of the truck for each of said axles, each said spring structure comprising a housing member, an inner member extending therethrough in spaced-apart relation thereto, and an intermediate body of resilient rubber-like material therebetween and secured to said members, said inner member of each spring structure being fixed to said car-supporting structure with the axis of the spring structure parallel to and adjacent the said longitudinal center line of the truck, and said housing member of each spring structure having an arm extending toward the near side of the truck with its end supported by and connected to a journal bearing at an end of an axle for swinging movement of said arm upon vertical movement of said journal bearing in its guideway.

4. A truck for a rail vehicle, said truck comprising a pair of wheeled axles each having a pair of wheels fixed thereto in spaced-apart relation, a truck-frame structure having pairs of cross-frame members fore and aft of its center and a pair of parallel side-frame members held in spaced-apart relation thereby and having vertical guideways for receiving journal bearings, journal bearings slideably mounted in said guideways for journaling the ends of said axles, pairs of resilient spring structures mounted on the cross-frame members of said frame structure, there being one spring structure at each side of the longitudinal center line of the truck for each of said axles, each said spring structure supporting the frame from an end of an axle and comprising a housing, a shaft extending therethrough in spaced-apart relation thereto, and a body of resilient rubber-like material between and secured to said housing and said shaft, said shaft of each spring structure being fixed at its ends to a pair of said cross-frame members of said frame with its axis parallel and adjacent the said longitudinal center line of the frame, and said housing of each spring structure having arms extending toward the near side of the truck with their ends supported by and connected to a journal bearing at an end of an axle for swinging movement of said arm upon vertical movement of said journal bearing in its guideway.

5. A truck for a rail vehicle, said truck comprising a pair of parallel wheeled axles each having a pair of rail wheels fixed thereto in spaced-apart relation, a truck-frame structure having pairs of cross-frame members fore and aft of its center and a pair of parallel side-frame members held in spaced-apart relation thereby and having vertical guideways for receiving journal bearings, journal bearings at the ends of said axles, said journal bearings being slideably mounted for vertical movement in said guideways, each journal bearing having a yoke mounted thereon with arms extending longitudinally of the truck, pairs of resilient spring structures mounted on the cross-frame members of said frame structure, there being a pair of said spring structures for each axle one at each side of the longitudinal center line of the truck, each said spring structure comprising a housing, a shaft extending therethrough in spaced-apart relation thereto, and an intermediate body of resilient rubber-like material therebetween and secured to both said housing and said shaft, the shaft of each spring structure being secured to a pair of said cross-frame members of said frame structure with its axis close to and parallel to the longitudinal center line of the truck, a pair of arms on each said housing extending toward the near side of the truck for swinging movement of said arms upon vertical movement of said journal bearing in its guideway, and links pivotally connecting the outer ends of said arms of said housing to the arms of a journal bearing yoke to support said frame structure from said journal bearings said axles and said wheels through said spring structures.

ALVIN S. KROTZ.

REFERENCES CITED

The following references are of record in the file of this patent:

UNITED STATES PATENTS

| Number | Name | Date |
|---|---|---|
| 2,191,211 | Krotz | Feb. 20, 1940 |
| 2,242,030 | Hicks | May 13, 1941 |
| 2,251,698 | Willson | Aug. 5, 1941 |
| 2,251,950 | Piron | Aug. 12, 1941 |
| 2,320,085 | Ledwinka | May 25, 1943 |
| 2,320,086 | Ledwinka | May 25, 1943 |
| 2,330,305 | Muchnic | Sept. 28, 1943 |
| 2,330,482 | Fageol | Sept. 28, 1943 |
| 2,345,201 | Krotz | Mar. 28, 1944 |
| 2,371,169 | Hickman | Mar. 13, 1945 |